United States Patent
Gero et al.

(10) Patent No.: US 10,785,280 B2
(45) Date of Patent: *Sep. 22, 2020

(54) MECHANISM FOR DISTINGUISHING BETWEEN CONTENT TO BE SERVED THROUGH FIRST OR SECOND DELIVERY CHANNELS

(71) Applicant: Akamai Technologies, Inc., Cambridge, MA (US)

(72) Inventors: Charles E. Gero, Quincy, MA (US); Guy Podjarny, London (GB)

(73) Assignee: Akami Technologies Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/862,348

(22) Filed: Jan. 4, 2018

(65) Prior Publication Data

US 2018/0131748 A1     May 10, 2018

Related U.S. Application Data

(63) Continuation of application No. 15/643,959, filed on Jul. 7, 2017, now Pat. No. 10,057,324, which is a continuation of application No. 14/138,777, filed on Dec. 23, 2013, now Pat. No. 9,729,605.

(60) Provisional application No. 61/746,229, filed on Dec. 27, 2012.

(51) Int. Cl.
*H04L 29/08* (2006.01)

(52) U.S. Cl.
CPC .......... *H04L 67/02* (2013.01); *H04L 67/2833* (2013.01); *H04L 67/2842* (2013.01)

(58) Field of Classification Search
CPC .............................. H04L 67/02; H04L 67/2833
USPC .......................................................... 709/219
See application file for complete search history.

(56) References Cited

U.S. PATENT DOCUMENTS

| | | | | |
|---|---|---|---|---|
| 7,389,330 B2* | 6/2008 | Dillon | ............... | G06F 17/30902 707/E17.12 |
| 7,600,025 B2* | 10/2009 | Lewin | .................... | H04L 29/06 709/218 |
| 8,543,667 B2* | 9/2013 | Hluchyj | .............. | H04L 67/2804 370/232 |
| 9,122,650 B1* | 9/2015 | Colton | .................... | G06F 17/20 |
| 9,729,605 B2 | 8/2017 | Gero et al. | | |
| 9,813,480 B2 | 11/2017 | Kolam et al. | | |

(Continued)

OTHER PUBLICATIONS

U.S. Appl. No. 14/138,777.

(Continued)

*Primary Examiner* — Vivek Srivastava
*Assistant Examiner* — Binod J Kunwar (57) ABSTRACT

Described herein are methods, apparatus and systems for selectively delivering content through one of two communication channels, one being origin to client and the other being from or through a CDN to client. Thus a client may choose to request content from a CDN and/or from an origin server. This disclosure sets forth techniques for, among other things, distinguishing between which channel to use for a given object, using the CDN-client channel to obtain the performance benefit of doing so, and reverting to the origin-client channel where content may be private, sensitive, corrupted, or otherwise considered to be unsuitable from delivery from and/or through the CDN.

9 Claims, 7 Drawing Sheets

(56) References Cited

U.S. PATENT DOCUMENTS

| | | | |
|---|---|---|---|
| 10,057,324 B2 | 8/2018 | Gero et al. | |
| 2002/0040400 A1* | 4/2002 | Masters | H04L 67/101 709/228 |
| 2005/0131900 A1* | 6/2005 | Palliyll | H04L 67/2819 |
| 2005/0256836 A1* | 11/2005 | Awamoto | G06F 17/30896 |
| 2007/0016492 A1* | 1/2007 | Linker | G06F 16/532 705/26.8 |
| 2009/0037515 A1* | 2/2009 | Zapata | H04L 43/0811 709/202 |
| 2010/0146415 A1* | 6/2010 | Lepeska | G06F 17/30 715/760 |
| 2011/0099467 A1* | 4/2011 | Kapur | H04L 67/02 715/236 |
| 2011/0099629 A1* | 4/2011 | Boesgaard | G06F 21/31 726/22 |
| 2012/0124372 A1* | 5/2012 | Dilley | H04L 67/2819 713/162 |
| 2012/0255027 A1* | 10/2012 | Kanakapura | H04L 63/126 726/26 |
| 2014/0189069 A1 | 7/2014 | Gero et al. | |

OTHER PUBLICATIONS

Communication Under MPEP § 609.02, dated Jan. 4, 2018, submitted with this form.

U.S. Appl. No. 15/643,959.

Braun, Frederik et al., "Subresource Integrity", W3C First Public Working Draft Mar. 18, 2014, available at http://www.w3.org/TR/2014/WD-SRI-20140318/ (downloaded Jan. 28, 2020), 18 pages.

Hunt, Troy , "Protecting your embedded content with subresource integrity (SRI)", blog post dated Aug. 29, 2016, available on https://www.troyhunt.com/protecting-your-embedded-content-with-subresource-integrity-sri/, (downloaded Jan. 28, 2020), 9 pages.

West, Mike , "webappsec-subresource-integrity/index.html", github repository dated Jan. 8, 2014, available at https://github.com/w3c/webappsec-subresource-integrity/blob/6953871247ac605f23203808b59a7ab9dd3162f1/index.html (downloaded Jan. 28 2020, 18 pages.

\* cited by examiner

MECHANISM FOR DISTINGUISHING BETWEEN CONTENT TO BE SERVED THROUGH FIRST OR SECOND DELIVERY CHANNELS

This application is a continuation of U.S. application Ser. No. 15/643,959, filed on Jul. 7, 2017, which is a continuation of U.S. application Ser. No. 14/138,777, filed on Dec. 23, 2013, which is a nonprovisional of and claims the benefit of U.S. Application No. 61/746,229, filed Dec. 27, 2012, the contents of all of which are hereby incorporated by reference.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application relates generally to distributed data processing systems and to the delivery of content over computer networks.

Brief Description of the Related Art

Distributed computer systems are known in the art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, typically content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence.

Figure 1:
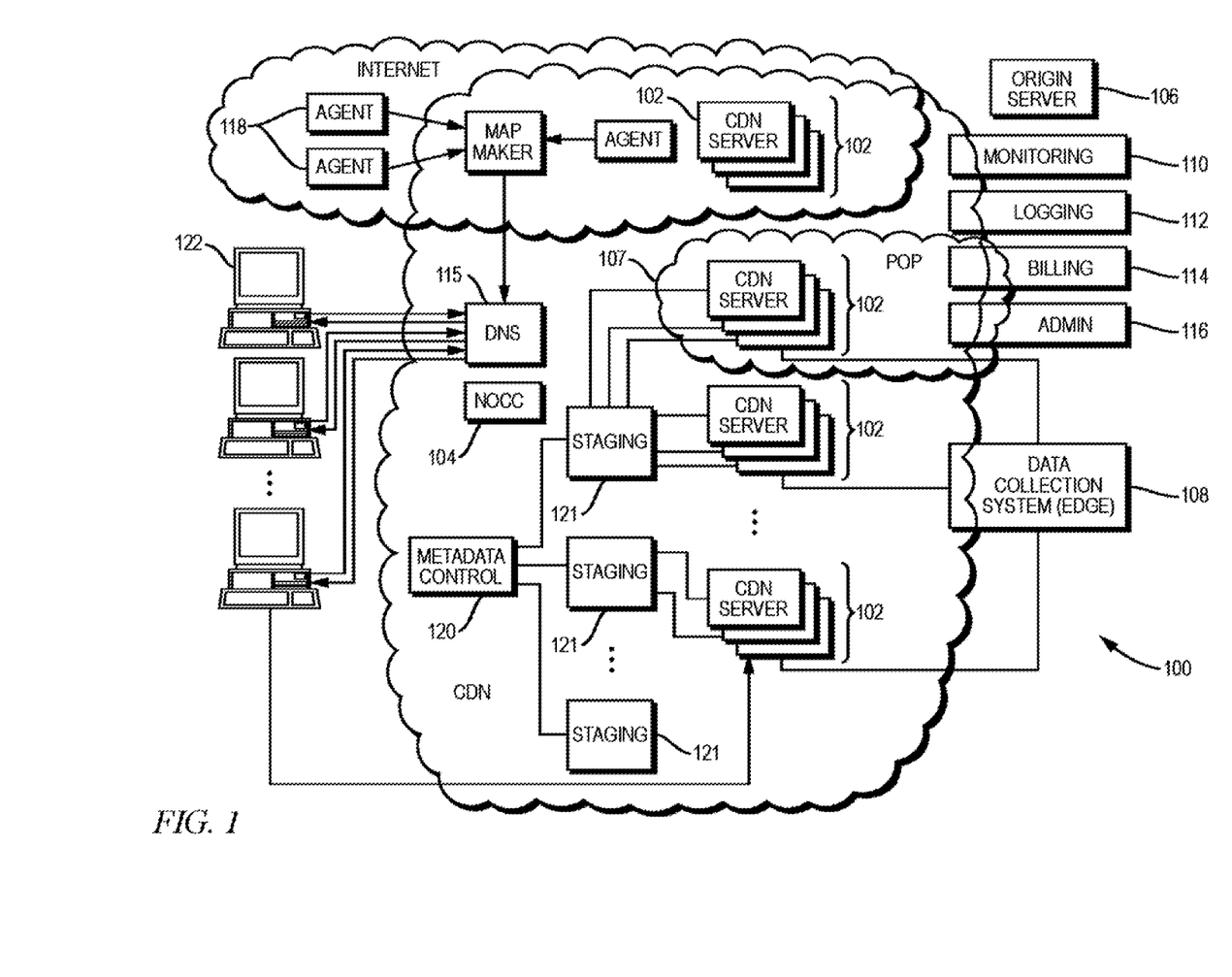
FIG. 1 is a schematic diagram illustrating an embodiment of a known distributed computer system configured as a content delivery network.

In a known system such as that shown in FIG. 1, a distributed computer system 100 is configured as a content delivery network (CDN) and has a set of machines, including CDN servers 102, distributed around the Internet. Typically, most of the servers are located near the edge of the Internet, i.e., at or adjacent end user access networks. A network operations command center (NOCC) 104 may be used to administer and manage operations of the various machines in the system. Third party sites affiliated with content providers, such as web site hosted on origin server 106, offload delivery of content (e.g., HTML or other markup language files, embedded page objects, streaming media, software downloads, and the like) to the distributed computer system 100 and, in particular, to the CDN servers 102 (which are sometimes referred to as content servers, or sometimes as "edge" servers in light of the possibility that they are near an "edge" of the Internet). Such servers may be grouped together into a point of presence (POP) 107 at a particular geographic location.

The CDN servers 102 are typically located at nodes that are publicly-routable on the Internet, within or adjacent nodes that are located in mobile networks, in or adjacent enterprise-based private networks, or in any combination thereof.

Typically, content providers offload their content delivery by aliasing (e.g., by a DNS CNAME) given content provider domains or sub-domains to domains that are managed by the service provider's authoritative domain name service. The service provider's domain name service directs end user client machines 122 that desire content to the distributed computer system (or more particularly, to one of the CDN servers in the platform) to obtain the content more reliably and efficiently. The CDN servers respond to the client requests, for example by serving requested content from a local cache, or by fetching it from another CDN server, from the origin server 106 associated with the content provider, or other source, and sending it to the requesting client.

For cacheable content, CDN servers 102 typically employ on a caching model that relies on setting a time-to-live (TTL) for each cacheable object. After it is fetched, the object may be stored locally at a given CDN server until the TTL expires, at which time is typically re-validated or refreshed from the origin server 106. For non-cacheable objects (sometimes referred to as 'dynamic' content), the CDN server typically must return to the origin server 106 when the object is requested by a client. The CDN may operate a server cache hierarchy to provide intermediate caching of customer content in various CDN servers closer to the CDN server handling a client request than the origin server 106; one such cache hierarchy subsystem is described in U.S. Pat. No. 7,376,716, the disclosure of which is incorporated herein by reference.

Although not shown in detail in FIG. 1, the distributed computer system may also include other infrastructure, such as a distributed data collection system 108 that collects usage and other data from the CDN servers 102, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115. A distributed data transport mechanism 120 may be used to distribute control information (e.g., metadata to manage content, to facilitate load balancing, and the like) to the CDN servers. The CDN may include a network storage subsystem (sometimes referred to herein as "NetStorage") which may be located in a network datacenter accessible to the CDN servers and which may act as a source of content, such as described in U.S. Pat. No. 7,472,178, the disclosure of which is incorporated herein by reference.

Figure 2:
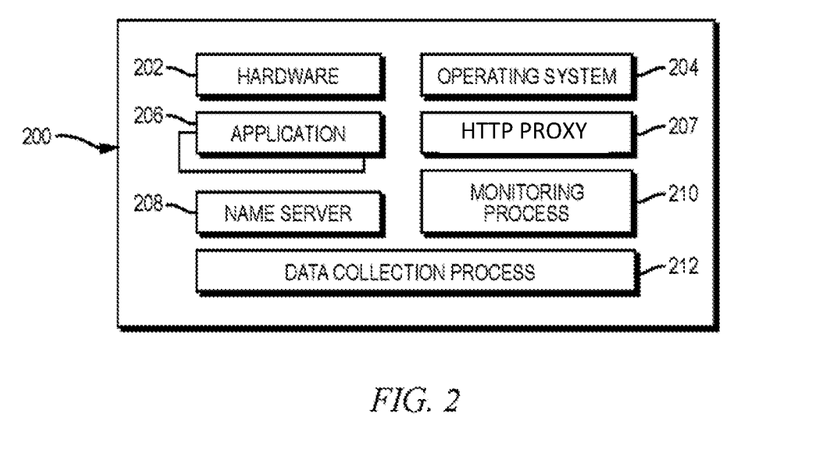
FIG. 2 is a schematic diagram illustrating an embodiment of a machine in the system of FIG. 1; and, FIG. 3A is a schematic diagram illustrating an embodiment of a system and its operation in accordance with the teachings hereof.

As illustrated in FIG. 2, a given machine 200 in the CDN comprises commodity hardware (e.g., a microprocessor) 202 running an operating system kernel (such as Linux® or variant) 204 that supports one or more applications 206. To facilitate content delivery services, for example, given machines typically run a set of applications, such as an HTTP proxy 207, a name service 208, a local monitoring process 210, a distributed data collection process 212, and the like. The HTTP proxy 207 typically includes a manager process for managing a cache and delivery of content from the machine. For streaming media, the machine may include one or more media servers, such as a Windows® Media Server (WMS) or Flash server, as required by the supported media formats.

A given CDN server 102 shown in FIG. 1 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN. More information about a CDN platform can be found in U.S. Pat. Nos. 6,108,703 and 7,596,619, the teachings of which are hereby incorporated by reference in their entirety.

In a typical operation, a content provider identifies a content provider domain or sub-domain that it desires to have served by the CDN. When a DNS query to the content provider domain or sub-domain is received at the content provider's domain name servers, those servers respond by returning the CDN hostname (e.g., via a canonical name, or CNAME, or other aliasing technique). That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server machine associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as mentioned previously.

The CDN platform may be considered an overlay across the Internet on which communication efficiency can be improved. Improved communications on the overlay can help when a CDN server needs to obtain content from an origin server, or otherwise when accelerating non-cacheable content for a content provider customer. Communications between CDN servers and/or across the overlay may be enhanced or improved using intelligent route selection, protocol optimizations including TCP enhancements, persistent connection reuse and pooling, content & header compression and de-duplication, and other techniques such as those described in U.S. Pat. Nos. 6,820,133, 7,274,658, 7,607,062, and 7,660,296, among others, the disclosures of which are incorporated herein by reference.

As an overlay offering communication enhancements and acceleration, the CDN resources may be used to facilitate wide area network (WAN) acceleration services between enterprise data centers and/or between branch-headquarter offices (which may be privately managed), as well as to/from third party software-as-a-service (SaaS) providers used by the enterprise users.

Along these lines, CDN customers may subscribe to a "behind the firewall" managed service to accelerate Intranet web applications that are hosted behind the customer's enterprise firewall, as well as to accelerate web applications that bridge between their users behind the firewall to an application hosted in the Internet cloud (e.g., from a SaaS provider).

To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end. More information about a behind the firewall service offering can be found in U.S. Pat. No. 7,600,025, the teachings of which are hereby incorporated by reference.

For live streaming delivery, the CDN may include a live delivery subsystem, such as described in U.S. Pat. No. 7,296,082, and U.S. Publication Nos. 2011/0173345 and 2012/0265853, the disclosures of which are incorporated herein by reference.

A CDN service provider typically takes a variety of measures to secure the storage and delivery of customer content while it resides on the CDN platform. A CDN typically supports industry standard communication technologies such as IPSec and/or secure socket layer/transport security layer (SSL/TLS) for communication between a requesting client and a CDN content server, and between machines in the CDN itself. However, to handle a given content provider's traffic, the CDN usually needs to have access to the content provider's SSL/TLS private keys and certificates, which some content providers dislike. Moreover, sometimes a content provider simply has certain content it is not willing to send over the CDN platform because the CDN is a third party.

As a result, a content provider may want to serve certain content (e.g., private/sensitive content) from their own origin infrastructure, while having other less sensitive content served through a CDN service and its infrastructure, so as to obtain a delivery performance benefit at least for that content. By splitting the traffic in this way, the customer can potentially avoid the need for the CDN to have the customer's SSL keys in the CDN network, avoid the possibility of customer-owned personal identifying information (PII) flowing through the CDN, and mitigate the risk of data corruption in the event of CDN breach (e.g., defacement of content, security breach, or otherwise).

Current techniques for configuring the origin and CDN to split traffic in this way have risk of misconfiguration and are subject to human error. Improved techniques for serving content as described herein can reduce if not eliminate the possibility of sensitive or PII data flowing across the CDN, while also reducing if not eliminating the chance that a compromise of the CDN (either through hacking, defacement, or other security issue, etc. or otherwise) will leak PII or negatively impact the customer's content.

Presented herein are systems, methods and apparatus that address these issues and that provide other features and benefits that will become apparent in view of the teachings hereof.

SUMMARY

Described herein are methods, apparatus and systems for selectively delivering content through one of two communication channels, one being origin to client and the other being from or through a CDN to client. Thus a client may choose to request content from a CDN and/or from an origin server. This disclosure sets forth techniques for, among other things, distinguishing between which channel to use for a given object, using the CDN-client channel to obtain the performance benefit of doing so, and reverting to the origin-client channel where content may be private, sensitive, corrupted, or otherwise considered to be unsuitable from delivery from and/or through the CDN.

The subject matter described herein has a variety of applications in content delivery and online platform architectures. The foregoing is by way of overview purposes to point out certain aspects of this patent document. It is not limiting and the teachings hereof may be realized in a variety of ways and in a variety of systems, methods, apparatus, and non-transitory computer-readable media.

BRIEF DESCRIPTION OF THE DRAWINGS

The teachings hereof will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the systems, methods and apparatus described herein. The systems, methods and apparatus described herein and illustrated in the accompanying drawings are non-limiting examples; the scope of the invention is defined solely by the claims.

The features described or illustrated in connection with one exemplary embodiment may be combined with the features of other embodiments. Such modifications and variations are intended to be included within the scope of the present disclosure. All patents, publications and references cited herein are expressly incorporated herein by reference in their entirety. Throughout this disclosure, the term "e.g." is used as an abbreviation for the non-limiting phrase "for example."

As mentioned previously, sometimes a content provider may want to serve private and/or sensitive content from their own origin infrastructure (referred to herein as a first channel), while having other content (e.g., public data or less sensitive content) served through a CDN service and its infrastructure (referred to herein as a second channel), so as to obtain a delivery performance benefit at least for the latter.

Presented herein are systems, methods and apparatus that address these needs; however, it should be noted that the teachings herein are not limited to CDNs or to a private/public distinction between content. The teachings hereof apply, without limitation, to a range of applications including wherever, for example, it is important to verify and distinguish between traffic that should flow through a first channel vs. a second channel.

The following embodiments are illustrated with reference of hypertext transfer protocol (HTTP), hypertext markup language (HTML), and other common web technologies, basic knowledge of which is presumed.

In one embodiment, a high-level methodology is as follows:

1. A given HTML file (or other markup language file or web page object with embedded references) is translated at an origin server to include verification codes for 'child' objects that are referenced therein. The verification codes are preferably content hashes or identifiers including such hashes, and thus serve as fingerprints for the object.

2. A client application, typically a browser, requests and receives the HTML for a page, either directly from origin or through a CDN. Once the HTML arrives at the client application, it requests the embedded objects with the verification codes from the CDN (e.g., from a particular CDN server).

3. The CDN server attempts to get the object, preferably in a public way (e.g., no cookies used to fetch it, no attempt to authenticate to origin, and/or request made to public IP address, etc.). The CDN server provides the object if possible, or if not a failure code to indicate that it is not available.

4. If the object is available and received from the CDN server, the client application verifies it (using the verification code) and, if correct, loads it in the page. Otherwise, the client goes back to the origin to obtain it.

Figure 3A:
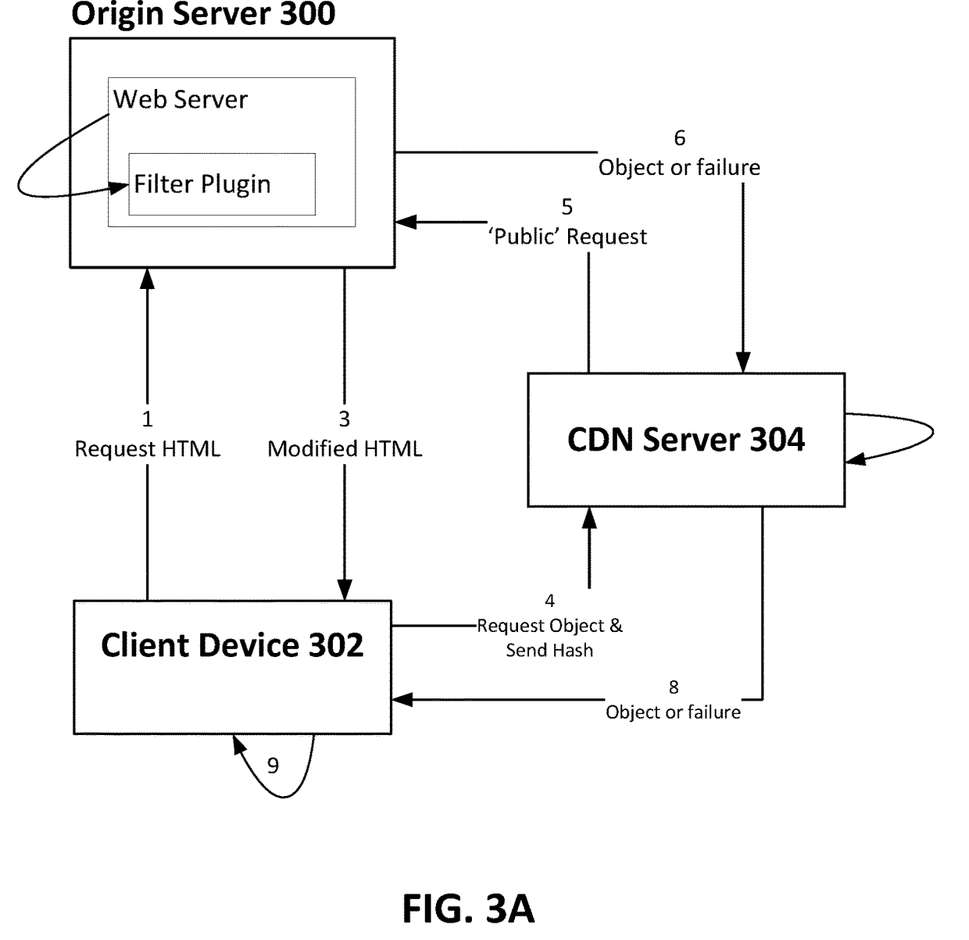
Figure 3B:
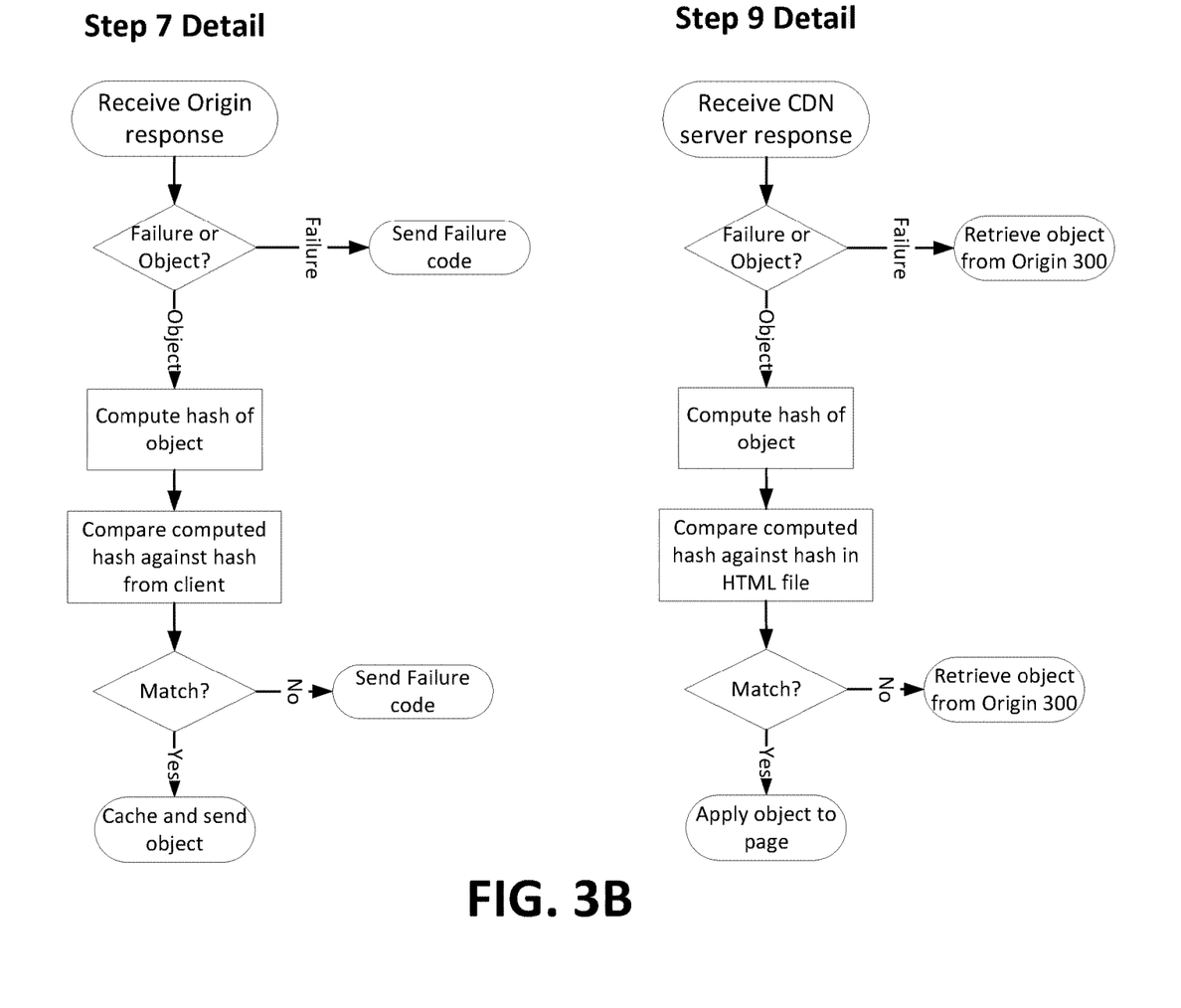
FIG. 3B is a flow diagram illustrating selected aspects of the operation of the system shown in FIG. 3A.

More specifically, and with reference to FIGS. 3A and 3B, in one embodiment, a system involves a client 302 making a request for an HTML file, shown as step 1. The client may request the HTML either directly from an origin server 300 or through a CDN server 304 that functions as a caching proxy. (FIG. 3A illustrates the former example.)

The origin web server application communicates with an origin-server-side plugin (sometimes referred to as a 'filter' or 'filter plugin') that examines HTML files requested by clients, which is shown as step 2. The plugin fetches each embedded object on a requested page, unless exempted via a configurable blacklist. It creates a hash (e.g., SHA3) of those objects or a portion of the object. The resulting hash can be cached to improve future performance. The plugin modifies the HTML to remove the URI (or other kinds of standard or proprietary references) to the embedded object and replaces it with a reference that points to a CDN domain and that has the hash of the object. A script (e.g., Javascript) is added to the HTML file that will process these special references in a special way at the client, which is described in detail later in this document. The script is referred to as the 'Control Script' (it is sometimes also referred to as a 'CDN Cache Control Script').

The modified HTML is sent to the client 302 (step 3), where the Control Script executes and functions to request each specially referenced object from a CDN domain, so that the client 302 will request it from a given CDN server 304. The Control Script also directs the client 302 to send the CDN server 304 the hash for the specially referenced object with the object request. (Step 4.)

The CDN server 304 requests the object from the origin without using any cookies, attempt to authenticate, and the like, so as to make the request be for a public version of the content and not a personalized/private version (step 5). The CDN server 304 receives a response, e.g., the object or an error, at step 6. At step 7, the CDN server 304 determines whether the request failed (e.g., perhaps due to lack of cookies), and if so, the CDN server 304 sends a failure code to the client. If successful, the CDN server 304 compares a computed hash of the object it receives with the hash it got from the client 302. If they don't match (e.g., perhaps due to the fact that the client-provided-hash corresponds to a personalized/private version and fetched-hash corresponds to a public version of the content), the CDN server 304 does not store the object and sends a failure code to the client 302. If the hashes do match, the CDN server 304 caches the received object and sends it to the client. Subsequent requests may be served from cache, in accordance with TTL and other cache-control rules.

With reference to steps 8-9 of FIG. 3A-3B, if the client 302 receives an error from the CDN server 304, then the client 302 fetches the object directly from the content provider origin. If the client 302 receives the object from the CDN server 304, the Control Script directs the client to compute the hash of the object and check it against its expected hash—i.e., another check of the hash. If it does not match, then the client 302 fetches the object directly from the content provider origin. The hashes might not match, for example, because of the issues previously identified (e.g., personalized/private version vs. public version) or because the content has been corrupted in the CDN. In effect the CDN pathway has proven not to be appropriate for this content. On the other hand, if the hashes do match, the Control Script applies the CDN-provided object to the page based on the content type (script, cascading style sheet or CSS, images) by the Control Script that was inserted by the plugin. This Control Script can leverage cross-domain AJAX or iFrames to do this, which will be described in more detail later. The process can be repeated for all of the remaining specially referenced objects in the HTML file.

With the foregoing by way of overview, more detailed embodiments are now described. First, certain aspects of the system are described.

Data URIs:

In HTML on modern browsers, it is possible to reference objects that should be loaded by embedding their data directly. For example:

<img src="/images/banner/corp_large.png">

Can become:

<img src="data:image/png;base64, iVBORw0KGgoAAAANS . . . ">

HTML5 Custom Data Attributes

In HTML5, it is allowed to store custom data within HTML attributes in tags when it is prefixed by "data-".

For example:

<img src="foo.gif" data-md5="3f29ad4fb3105fdb84bd38f109d9dba">

Here, data-md5 is accessible via JavaScript.

Note: This can also be achieved on older browsers through clever id naming.

HTML5 Window Post Message:

HTML5 and modern browsers contain a mechanism for one window/frame to communicate with another window/frame regardless of whether or not the two are hosted on different domains.

window.postMessage involves sending data from a first frame (e.g., CDN domain) to a second frame (e.g., the customer domain, which is the domain of the HTML file)

The receiving frame has a choice of whether it would like to accept it or reject it.

HTML Dependency Graph

Theoretically, web pages can be modeled as a dependency graph. For example, a page may include CSS files, JavaScript files, other pages in iFrames, images, and so on. These are the embedded objects (sometimes referred as resources) for the page.

Figure 4:
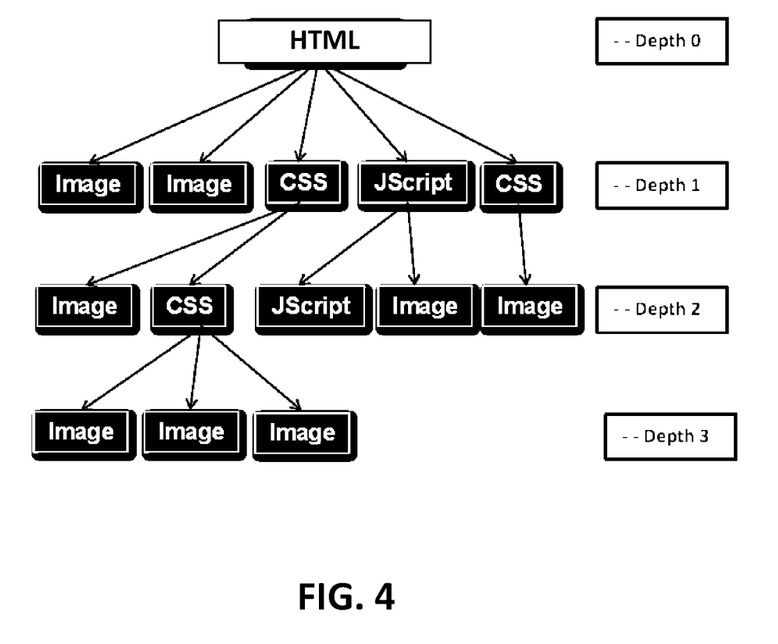
FIG. 4 is a schematic diagram illustrating a dependency graph for a web page, in accordance with one embodiment.

The CSS files, other pages, and JavaScript files can include or reference other things themselves. This forms a graph with the initial page being the root node. Each successive included item is one depth farther from the root, as shown in FIG. 4.

Child Authenticity and Integrity Categories:

Preferably, all objects capable of having children in the Page Dependency Graph (that is, they are not restricted to being a leaf node) fall into one of two possible categories, unrestricted and restricted.

Unrestricted: An Unrestricted entity is an object that is capable of determining its children's authenticity and integrity, regardless of where they come from. Such objects can safely retrieve child data unrestricted from the CDN, as they can be trusted to verify the content is correct.

Restricted: These entities do not have the proper tools to verify their children's authenticity and integrity, and thus are restricted to fetching them from the origin (content provider) host only.

System Theory

In an embodiment, at the origin server, whenever an HTML file for a page is about to be served in response to a request, it is passed through a server-side filter plugin. The server side filter plugin could be an IIS ISAPI filter or an Apache module, for example.

This filter can first check to see if the HTML being requested should be modified. It can determine that, for example, according to rules defined below. If it is determined that the HTML should be modified, the filter plugin can perform translations with varying risk and complexity depending on configuration.

The items that the filter checks can be, for example:

User Agent—Is this client device and the client application capable of utilizing the technologies needed?

White List/Black List Regular Expression—Does the requested URI match a configurable white-list or black-list to be served (or not) through the CDN?

Depth Count—Is the user requesting a depth count that disallows processing? This will be covered later in more detail.

The filter preferably functions to convert 'Restricted' objects into 'Unrestricted' objects so that child items (e.g., the embedded objects in the page) may be downloaded through the CDN as was described with respect to FIG. 3A-3B.

Remember that a page load can be thought of in terms of its Page Dependency Graph. To convert everything in the graph into Unrestricted items, it would be necessary to start at the bottom and work our way up, since items at the top depend on the modified item hashes at the bottom. This could be expensive from a computing point of view. Because of the possible expensive nature of this operation, it is preferable to do two things: First, cache the results. Second, introduce the concept of a maximum depth count. Conceptually, the maximum depth count places a line above which we will convert Restricted items to Unrestricted. Below the line, everything is unchanged and therefore we don't have to extend fully to the bottom to hash. In the FIG. 5 example, the depth count is 2, as indicated by the dotted line.

Figure 5:
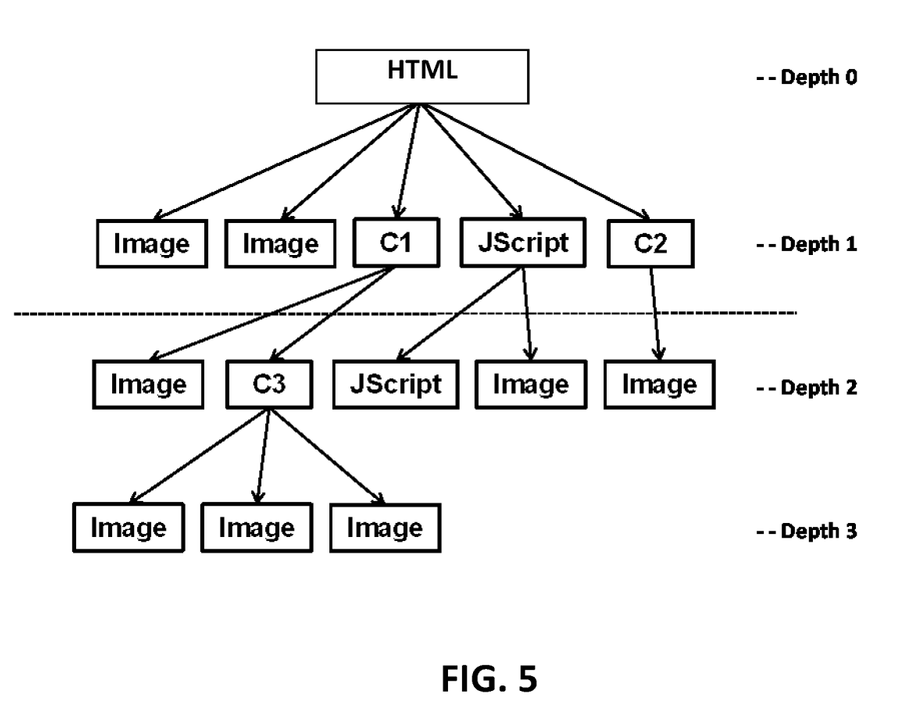
FIG. 5 is a schematic diagram illustrating a dependency graph for a web page, in accordance with one embodiment; and, FIG. 6 is a block diagram illustrating hardware in a computer system that may be used to implement the teachings hereof.

Upon modification, the content of initial HTML file will depend on C1's content because the HTML file's embedded reference to CSS C1 will be replaced with a hash identifier version (an example of the format of the hash identifier version of the embedded reference is provided later, but suffice it to say here that it includes a hash of the referenced object). But, because C1 will also be changed (as its own embedded references will be modified to use hash identifier versions of those references), we need to translate C1 first. C3 is below the line, so that does not need to be translated. Thus, C1 becomes C1' which has a reference with hash (C3) in it. Then the initial HTML gets hash (C1'). New requests should specify where the cut line is to be able to reproduce the same operations.

Note that while conversion in response to a request for the HTML is the basic case, a request could arrive for any object in the Page Dependency Graph, including objects with references such as C1 or JScript in FIG. 5. Generalizing, the filter can initiate a conversion from restricted to unrestricted at any point in the Page Dependency Graph, and in response to requests for any object, not just the HTML.

Processing Steps/Plugin Operation

The following is an example of a set of processing steps for the server-side filter plugin:

1. When a request for an object arrives, check to see if it should be modified for the CDN. If not, pass through.
2. If it should be modified for download through CDN, check whether there a depth count header with the object request. If so, make depth count equal the header value. Otherwise, use the default configured for the particular content provider customer.
3. If depth count is zero, serve the item directly.
4. Otherwise, translate the item and sub items to Unrestricted and serve it.

Continuing the HTML example, to modify an HTML file for the CDN, the filter can ensure there is a head section and place a link to a script (e.g., to a JavaScript file), the aforementioned 'Control Script'. The filter can also inject a piece of CSS that includes a special class that hides iFrames.

Next, all image, CSS, and JavaScript tags are rewritten such that their src/href tags points at an empty data URI, and the real URI is placed in "data-cdn-src". Additionally, a "data-cdn-hash" attribute is added to give the hash of the real object, as well as a "data-cdn-dc" attribute to give the depth count that was reached to process the item and obtain the given hash.

For example, if the configured depth count is five, and a child CSS node was at depth two, we would list the depth count remaining for the child as three. This would allow a CDN Server, if it needs to fetch that CSS object due to a cache miss later, to tell the filter how many levels below that CSS object must also be converted to Unrestricted in order to properly generate a hash for that CSS object. (This assumes the filter actually needs to convert that CSS object to Unrestricted. The CSS object may have been previously converted as part of generating an Unrestricted HTML and cached at the origin server, which could obviate the need to do the conversion.)

An example of the filter's modification/rewriting of an image tag goes as follows:

<img src="/foo.gif">

It can be changed to:

<img src="data:image/gif;base64,mjK189 . . . "
data-cdn-src="/foo.gif"
data-cdn-hash="283Fa39c7da4b . . . "
data-cdn-dc="1"
width="110" height="44">

Here, the data URI for the 'src' is a blank 1 pixel GIF file, 'data-cdn-hash' is the hash of the real image foo.gif, 'data-cdn-dc' is the depth count that was remaining when this hash was calculated, and width and height are optionally added to make the blank image take up the same space as the real one on the page.

The HTML file thus passes through the filter, and is sent to the requesting client. Note that in addition to rewrite/ modification logic, the filter may contain some user-agent detection logic so that the particular client device (and its characteristics) can be taken into account during the rewrite/ modification.

Once it has been downloaded at the client, the Control Script begins execution in the client browser. It searches through the document object model (DOM) for all elements with the label 'data-cdn-src'. Preferably, for each one found, it also gets the referenced hash and stores it internally in an array. The array will then contain all items that can be downloaded from third parties such as the CDN and verified.

The Control Script then generates an iFrame for each one of the embedded objects that looks, for example, as follows:

<iframe src="https://foo.cdn.com/ ?h=$HASH&p=$PATH&d=$DC" class="Hide">

The $HASH above represents the object's hash, the $PATH is the object's path, and $DC is the depth count to use when calculating the children nodes. The CDN hostname causes the client to connect out to the much shorter round trip time to the CDN server. Further, all returned content will be securely sandboxed as it is within an iFrame.

The client looks up the CDN hostname and is given an IP address pointing to a given CDN server, from which it will request candidate embedded objects. Upon receiving such a request from the client, the CDN server reads in the requested URI and the Referrer header. This gives it the origin hostname, the hash of the object it needs, and the object's path. The CDN server then looks the object up in its cache.

If the object is present and the hashes match, the CDN server generates an HTML with an embedded script that will run on the client to window.postMessage the object data back to the main page. The CDN server gives the HTML a TTL matching the original object.

If not found or if the hash in cache does not match, the CDN server will attempt to download the object from origin using the given referrer and path and in a way such that it fetches just the public objects. For example, the CDN server can request the object without any cookies being forward along, without authentication, and the like. If successful and the hashes match, the CDN server will cache the object locally for the TTL noted from the origin. Additionally, the CDN server may optionally evict other items in the cache under the same cache key of host name and path which do not have matching hashes. Finally, the CDN server generates an HTML with an embedded script that will run on the client to window.postMessage the object data back to the main page.

If not successful in the download from origin, or if the hashes do not match, the CDN server returns (to the client) an HTML with a script embedded that will window.postMessage a failure code back to the main page at the client. This page is preferably given a "negative response" TTL value. This would be a system defined TTL value on the CDN server that ensures that the CDN server will not be asked for this content again for some configurable time.

Back on the client, if the downloaded HTML within the iFrame issues a window.postMessage with a failure code, the Control Script changes the src' attribute of the original object to match the 'data-cdn-src' attribute, causing the client to fetch it directly from the origin. On subsequent downloads of the initial page at a later time, the referenced HTML page in the iFrame will have been cached locally with the "negative response" TTL and the process of reaching out to the CDN (which ultimately failed) for the item will be skipped.

If the window.postMessage contains object data rather than a failure code, the Control Script hashes the data to verify that the contents are what is expected. If the hash does not match, the client behaves as if it retrieved a failure code (above), along with potentially issuing some warning via a REST call to the origin or other content provider infrastructure.

If the hashes match, the Control Script loads the data, representing the embedded object of interest, into the main page. It can do this by replacing the associated resource's src' attribute with the data URI version of the data it received and/or performing other load methods such as JavaScript eval. Then the client continues the page rendering process with the embedded object, obtained either from the CDN or from the origin.

If the object that is loaded itself has links (the resource was itself also Unrestricted), the process is repeated recursively to obtain the embedded objects. This allows multiple depths of page resources to function.

Advantages of the system can include the following. The identification of such advantages should not be taken to imply that such results must be obtained to practice the teachings hereof, but rather as an illustration of potential uses.

The CDN Customer Does Not Share Private SSL Key
    Performance Benefit of Caching Public/Static Objects Through CDN is Maintained
    Designed to prevent discovery of customer PII via CDN through attack or otherwise
    Designed to prevent defacement of customer site via CDN through attack or otherwise (authenticity assurance)
    Ease of deployment
    Automatically mitigates for private resources erroneously being modified (e.g., by the filter plugin) to point to the CDN, since the hashes won't match for private vs. public versions, and the client will go to the origin.
    Automatically mitigates for geographic-specific or end-user client specific content—also because hashes won't match—and client will go to origin.
    Automatically adapts for updated/expired content at the CDN server cache. When the content changes, so does its hash, and the content is then served through the direct to origin channel. This means the customer can set very long TTLs for the CDN and rely on the CDN to notice when the hash changes.

Many other embodiments and variations are possible. In particular, the origin server modification, and object retrieval processes described above can be performed alike in other environments and using other technologies. The teachings hereof are not limited to HTTP and HTML. For example, rather than a page defined by HTML or the like, a page may be described in XML, SGML, or other markup language file, or other file that has embedded objects and/or is capable of being expressed in a dependency graph structure. Instead of a web browser, the client may be an 'app' built for consumer use or for enterprise purposes and programmed to be able to render pages from HTML, XML, or such formats supported by the app and the origin. The functionality of the Control Script may then be programmed natively into the application. The 'page' may instead be streaming or multimedia content defined by a manifest file that lists referenced objects (in this case, stream chunks) with the hash and other information. The client may thus be a multimedia player.

Further, any service provider platform may perform the role of the CDN described herein, including platforms from infrastructure as a service (IaaS) and platform as a service (PaaS) providers, including those offered by internet service providers. In some cases, the distinction and decision-making as to retrieving content through one of two channels could be a choice between retrieving the object from/through a first CDN vs. retrieving it from/through a second CDN.

Additional Disclosure of Embodiments

In another embodiment, there is a system, comprising: a first server that modifies a markup language file by rewriting a reference to an object to include a verification code for the object; a client device that receives the modified markup language file and requests the object from a second server; a second server that, upon receiving the request for the object from the client device, requests the object from the first server, receives a first response from the first server, and sends a second response to the client device; the client device receiving the second response from the second server, and based on the second response, determining whether to request the object from the first server; wherein each of the first server, second server, and client device comprises circuitry forming one or more processors and a storage device holding instructions for execution by the one or more processors.

In some implementations of the aforementioned system, the verification code comprises a hash of the object.

In some implementations of the aforementioned system, the markup language file comprises an HTML or XML file.

In some implementations of the aforementioned system, the first server comprises an origin server associated with a content provider and the second server comprises a proxy server operated by a content delivery network on behalf of the content provider.

In some implementations of the aforementioned system, the first server further modifies the markup language file by adding a script that will execute to instruct the client device how to handle the rewritten reference to the object.

In some implementations of the aforementioned system, the second server requests the object from the first server without cookies.

In some implementations of the aforementioned system, the second server determines to send a failure code in the second response, based on any of: (i) receiving a failure code from the first server in the first response, and (ii) receiving data potentially corresponding to the object in the first response, and determining that a verification code for the data does not match the verification code for the object, and therefore that the data does not correspond to the object.

In some implementations of the aforementioned system, the verification code for the object is a hash of the object, and second server calculates the verification code for the data by calculating a hash of the data.

In some implementations of the aforementioned system, the client device sends the verification code for the object to the second server when sending the second server the request for the object.

In some implementations of the aforementioned system, the client device requests the object from the first server, based on any of: (i) receiving a failure code from the second server in the second response, and (ii) receiving data potentially corresponding to the object in the second response, determining that a verification code for the data does not match the verification code for the object, and therefore that the data does not correspond to the object.

In some implementations of the aforementioned system, the verification code for the object is a hash of the object, and client device calculates the verification code for the data by calculating a hash of the data.

In another embodiment, there is an apparatus, comprising circuitry forming one or more processors and a storage device holding program instructions for execution by the one or more processors to cause the apparatus to: receive a request for an object from a client device, the request including a hash of the object; request the object from an origin server, and receive data from the origin server in response; compute a hash for the data and determine whether the computed hash matches the hash of the object received in the request from the client device; when the computed hash matches the hash of the object, serve the data in response to the request from the client device.

In some implementations of the aforementioned apparatus, when the computed hash does not match the hash of the object, the apparatus serves a failure code in response to the request from the client device.

In some implementations of the aforementioned apparatus, the object comprises any of: HTML file, CSS file, image, script.

In some implementations of the aforementioned apparatus, if the computed hash matches the hash of the object, the apparatus serves the data in response to the request from the client device within an iFrame.

In some implementations of the aforementioned apparatus, when the computed hash matches the hash of the object, the apparatus caches the data locally.

In some implementations of the aforementioned apparatus, the request for the object from the origin server is an HTTP request without cookies.

In some implementations of the aforementioned apparatus, the apparatus is a content delivery network (CDN) server.

In another embodiment, there is a non-transitory computer readable storage medium, storing one or more programs for execution by one or more processors of a computer apparatus, wherein the one or more programs include instructions for: receiving a request for an object from a client device, the request including a hash of the object; requesting the object from an origin server, and receiving data from the origin server in response; computing a hash for the data and determine whether the computed hash matches the hash of the object received in the request from the client device; when the computed hash matches the hash of the object, serving the data in response to the request from the client device.

In another embodiment, there is method operative at a client device, comprising: receiving a markup language document, the markup language document including at least one reference to an object, the at least one reference including an attribute providing a hash of the referenced object; requesting the object from a first server; receiving a response from the first server that includes data that potentially corresponds to the object; calculating a hash for the data; comparing the calculated hash for the data to the hash provided for the referenced object, so as to determine whether the data corresponds to the object; based on the comparison, determining whether to request the object from a second server.

In some implementations of the aforementioned method, the first server comprises a server operated by a service provider on behalf of content providers and the second server comprises an origin server associated with a given one of the content providers.

In some implementations of the aforementioned method, the markup language document includes a script that instructs the client device how to request the referenced object.

In some implementations of the aforementioned method, the method further comprises, upon a determination that the calculated hash for the data matches the provided hash for the referenced object, applying the data when rendering a page defined by the markup language document.

In some implementations of the aforementioned method, the method further comprises processing the markup language document in a native client device application configured to determine whether to request the object from the second server.

In another embodiment, there is a system, comprising: a first server that modifies a markup language file by rewriting a reference to an object to include a verification code for the object; a client device that receives the modified markup language file and requests the object from a second server; a second server that, upon receiving the request for the object from the client device, retrieves data from a local cache; the second server sending a second response that includes the data to the client device; the client device receiving the second response from the second server, and based on the second response, determining whether to request the object from the first server; wherein each of the first server, second server, and client device comprises circuitry forming one or more processors and a storage device holding instructions for execution by the one or more processors.

In some implementations of the aforementioned system, the client device requests the object from the first server, based on: receiving the data in the second response, determining that a verification code for the data does not match the verification code for the object, and therefore that the data does not correspond to the object.

In some implementations of the aforementioned system, the verification code comprises a hash of the object.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 6:
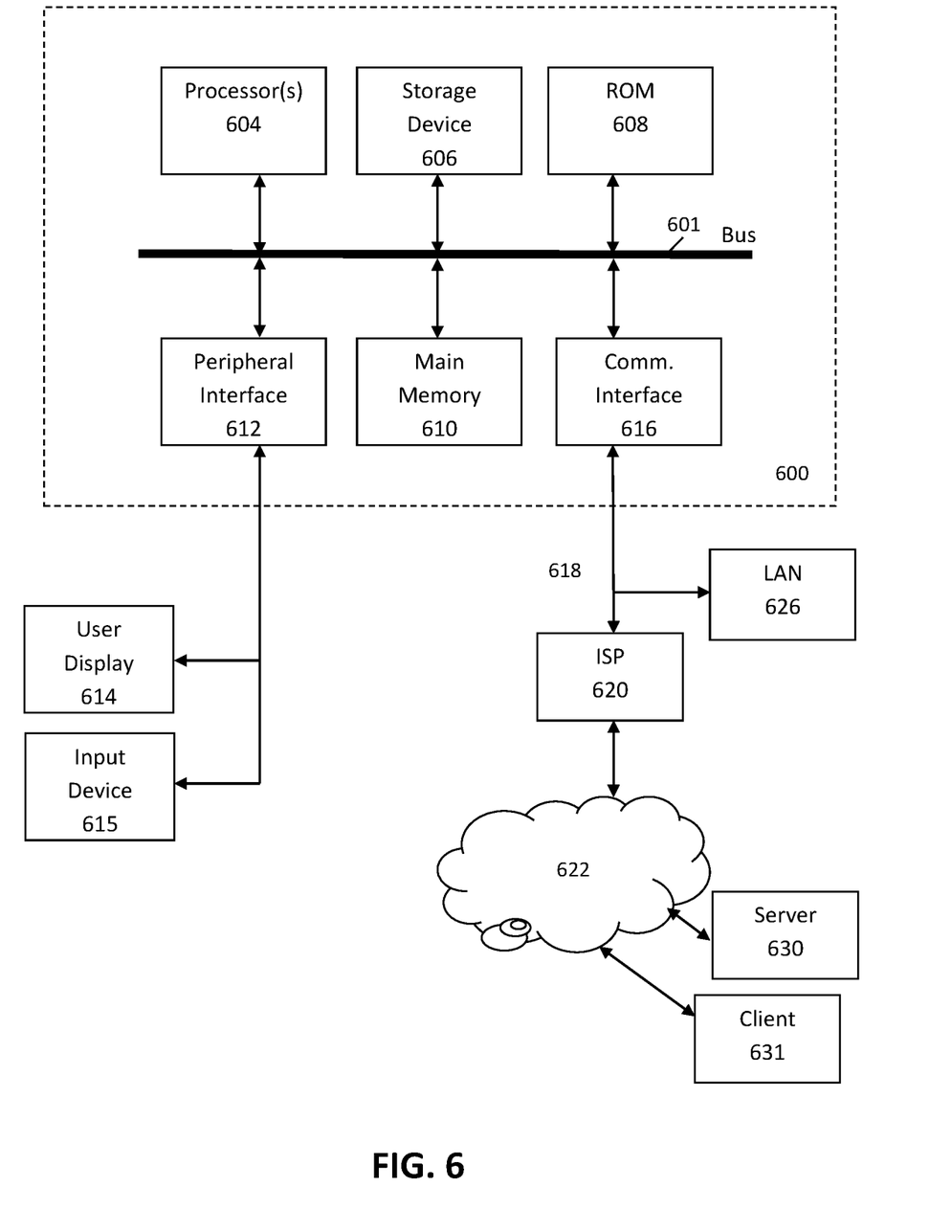

FIG. 6 is a block diagram that illustrates hardware in a computer system 600 on which embodiments of the invention may be implemented. The computer system 600 may be embodied in a client device, server, personal computer, workstation, tablet computer, wireless device, mobile device, network device, router, hub, gateway, or other device.

Computer system 600 includes a microprocessor 604 coupled to bus 601. In some systems, multiple microprocessor and/or microprocessor cores may be employed. Computer system 600 further includes a main memory 610, such as a random access memory (RAM) or other storage device, coupled to the bus 601 for storing information and instructions to be executed by microprocessor 604. A read only memory (ROM) 608 is coupled to the bus 601 for storing information and instructions for microprocessor 604. As another form of memory, a non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

Although the computer system 600 is often managed remotely via a communication interface 616, for local administration purposes the system 600 may have a peripheral interface 612 communicatively couples computer system 600 to a user display 614 that displays the output of software executing on the computer system, and an input device 615 (e.g., a keyboard, mouse, trackpad, touchscreen) that communicates user input and instructions to the computer system 600. The peripheral interface 612 may include interface circuitry and logic for local buses such as Universal Serial Bus (USB) or other communication links.

Computer system 600 is coupled to a communication interface 616 that provides a link between the system bus 601 and an external communication link. The communication interface 616 provides a network link 618. The communication interface 616 may represent an Ethernet or other network interface card (NIC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches.

In operation, the computer system 600 may implement the functionality described herein as a result of the microprocessor executing code. Such code may be read from or stored on a non-transitory computer-readable medium, such as memory 610, ROM 608, or storage device 606. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 618 (e.g., following storage in an interface buffer, local memory, or other circuitry).

The client device may be a conventional desktop, laptop or other Internet-accessible machine running a web browser or other rendering engine, but as mentioned above the client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, the mobile device is a cellular telephone that operates over GPRS (General Packet Radio Service), which is a data technology for GSM networks. Generalizing, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A system for selecting either a first server or a second server to deliver an object to a client device, comprising:
a first server, a second server, and a client device, each comprising circuitry forming one or more processors and a storage device having a non-transitory computer-readable medium;
wherein the first server comprises an origin server associated with a content provider and the second server comprises a proxy server for delivering objects from the origin server to client devices;
the non-transitory computer-readable medium of the first server holding a first set of instructions for execution by the one or more processors of the first server, the first set of instructions comprising instructions for the first server to:
modify a HTML file by rewriting a reference to an object in the HTML file to include a hash for the object and by inserting a script to be executed by the client device;
send the modified HTML file to the client device;
the non-transitory computer-readable medium of the client device holding a second set of instructions for execution by the one or more processors of the client device, the second set of instructions comprising instructions for the client device to receive the modified HTML file, execute the script, and, in response to execution of the script, send a request for the object to the second server;
the non-transitory computer-readable medium of the second server holding a third set of instructions for execution by the one or more processors of the second server, the third set of instructions comprising instructions for the second server to, upon receiving the request for the object from the client device:
request the object from the first server;
receive a first response from the first server in response to the second server's request, the first response including particular data, and
send a second response to the client device in response to the request for the object from the client device, the second response including the particular data;
the second set of instructions further comprising instructions for the client device to receive the second response from the second server, and based on the second response, determine whether to request the object from the first server;
wherein said determining by the client device whether to request the object from the first server comprises, in response to execution of the script, calculating a hash for at least a portion of the particular data, and comparing the calculated hash with the hash for the object that was in the modified HTML file, and:
(i) upon a determination that the hashes do not match, requesting the object from the first server; and
(ii) upon a determination that the hashes match, determining that the particular data represents the object, and in response loading the particular data into a web page.

2. The system of claim 1, wherein the first server comprises an origin server associated with a content provider and the second server comprises a proxy server operated by a content delivery network on behalf of the content provider.

3. The system of claim 1, wherein the third set of instructions further comprising instructions for the second server to request the object from the first server without forwarding cookies.

4. The system of claim 1, wherein the client device's request for the object from the second server includes a URI for the object, the URI including the hash for the object.

5. The system of claim 1, wherein the object is any of an image, a CSS file, and a script.

6. The system of claim 1, wherein the client device executes a browser application.

7. A method operative at a client device for selecting either a first server or a second server from which to retrieve an object, comprising:
receiving a HTML file, the HTML file including at least one reference to an object, the at least one reference including an attribute providing a hash of the object, the HTML file further including a script;
requesting the object from a first server;
receiving a response from the first server that includes particular data, the particular data being available from the second server;
executing the script, and in response to execution of the script:
calculating a hash for the particular data;
comparing the calculated hash, which is for the particular data, to the hash provided in the attribute for the referenced object, so as to determine whether the particular data represents the object;
based on the comparison, determining whether to request the object from a second server, wherein said determining comprises (i) upon a determination that the hashes do not match, determining to request the object from the second server; and (ii) upon a determination that the hashes match, determining that the particular data represents the object and in response loading the particular data into a web page;
wherein the second server comprises an origin server associated with a content provider and the first server comprises a proxy server for delivering objects from the origin server.

8. The method of claim 7, wherein the first server comprises a server operated by a service provider on behalf of content providers and the second server comprises an origin server associated with a given one of the content providers.

9. The method of claim 7, wherein the object is any of an image, a CSS file, and a script.

* * * * *